United States Patent [19]
Ramsey

[11] Patent Number: 5,580,254
[45] Date of Patent: Dec. 3, 1996

[54] COMMUNICATION AID

[76] Inventor: Anthony Ramsey, 9443 Goddard, Overland Park, Kans. 66214

[21] Appl. No.: 379,747
[22] Filed: Jan. 27, 1995
[51] Int. Cl.⁶ ................................................ G09B 19/00
[52] U.S. Cl. .................. 434/236; 434/112; 116/DIG. 41
[58] Field of Search ...................... 434/112, 236, 434/237, 98, 157; 273/150, 148 A, 141 R; 116/306, 309, 313, 318, 319, 320, 327, 328, 335, 223, DIG. 41; 40/122, 189, 721

[56] References Cited

U.S. PATENT DOCUMENTS

| | | |
|---|---|---|
| 3,217,690 | 11/1965 | Mihalisin . |
| 3,454,279 | 7/1969 | Foley et al. ........................ 273/141 R |
| 3,858,333 | 1/1975 | Kopp . |
| 4,165,890 | 8/1979 | Leff . |
| 4,552,534 | 11/1985 | Krempel . |
| 4,795,348 | 1/1989 | Garthwaite . |
| 4,936,170 | 6/1990 | Zumeta ............................ 116/335 X |
| 5,000,446 | 3/1991 | Sarno . |
| 5,040,988 | 8/1991 | Brown ..................................... 434/236 |
| 5,312,257 | 5/1994 | Tarvin et al. . |
| 5,359,733 | 11/1994 | Brannon et al. ........................ 2/195.1 |

Primary Examiner—Gene Mancene
Assistant Examiner—Jeffrey A. Smith
Attorney, Agent, or Firm—Chase & Yakimo

[57] ABSTRACT

A silent communication system presents a plurality of color coded cards, each card corresponding to a mood of the user as set forth in writing on a separate master plan. First and second embodiments of the display devices are shown so that the user may select a color from a plurality of colors and display the same to third persons, the color selected corresponding to the user's mood. Colored cards, device and master plan cooperate to form a communication system which enables the user to initially communicate his/her mood to others so that subsequent, appropriate verbal communications can be initiated.

14 Claims, 3 Drawing Sheets

Color Language Dictionary

Yellow - How do you feel
Green - How can we help
Brown - Time to cool off
Pink - I feel lost
White - Listen
Blue - Friends
Other colors......

Red - I need help
Orange - Time out
Teal - You're grounded
Gray - I feel good
Cranberry - optional
Black - Respect

COLOR #1 - I NEED HELP

- #2 - DO YOU NEED HELP?
- #3 - OVERLOAD WORK, DO NOT DISTURB
- #4 - OVERLOAD WORK, HELP AND I'LL OWE YOU ONE
- #5 - OOPS I'M SORRY
- #6 - TIME FOR A RAISE
- #7 - I LOVE MY JOB, OTHERWISE I'LL BE GOLFING OR......
- #8 - WHAT'S UP FOR LUNCH?
- #9 - BARE WITH ME, PERSONAL PROBLEM ON ITS WAY OUT. HOPEFULLY
- #10 - HELPING HAND AVAILABLE
- #11 - YOU NEVER LISTEN TO ME

FIG. 5

Color Language Dictionary

Yellow - How do you feel
Green - How can we help
Brown - Time to cool off
Pink - I feel lost
White - Listen
Blue - Friends
Other colors......

Red - I need help
Orange - Time out
Teal - You're grounded
Gray - I feel good
Cranberry - optional
Black - Respect

COMMUNICATION AID

BACKGROUND OF THE INVENTION

This invention relates to a communication system and, more particularly, to a visual communication aid which is adapted to silently convey the mood of a user to others.

In today's world different persons verbally react to different situations in various manners, the verbal reactions being in some cases negative and/or destructive ones which can lead to tragic outcomes. Such verbal reactions are peculiar to the individual and may not be conveyed properly to other parties, particularly when the individual has difficulty in properly communicating his/her mood. In turn, the outside parties, not being able to discern the mood of the individual, are hesitant to initiate communication with the individual fearing that they may say the wrong thing. Accordingly, it is desirable to have a communication system which can be used in lieu of speech so as to avoid the subsequent problems associated therewith.

In response thereto I have provided a silent communication system which utilizes a plurality of colored cards, the color of each card corresponding to a different mood of the user. Third persons are provided with a written master plan which corresponds potential user moods with various colors as displayed on the cards. Various types of display devices allow the user to have a ready inventory of the variously colored cards in order to select and display one such cards according to the user's mood most closely approximating the mood on the master plan. The system enables the user to effectively and silently communicate his/her initial mood to third parties so that the third party may be apprised of the user's mood and approach the user with appropriate verbal communications, if appropriate and so desired.

It is therefore a general object of this invention to provide an effective communication system without the need for initial verbal speech.

Another object of this invention is to provide a communication system, as aforesaid, which utilizes a plurality of colored cards, the color of each card corresponding to a potential mood of the user as set forth on a written master plan.

Still another object of this invention is to provide a communication card, as aforesaid, which provides various devices for storing the colored cards and/or displaying one of the selected colored cards as chosen by the user.

A further object of this invention is to provide a communication system, as aforesaid, which is portable and thus available for use in various environments.

A further particular object of this invention is to provide a communication system, as aforesaid, which enables the user to display his/her mood or approximations thereof so as to initiate further verbal communication.

Another object of this invention is to provide a communication system, as aforesaid, which can be adapted for use by individuals who have difficulty communicating their moods and/or other expressions.

A further object of this invention is to provide a communication system, as aforesaid, which eliminates barriers for initial communication so as to enhance the chances of subsequent harmonious verbal communications.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 5 is one form of a written master plan;

FIG. 6 is an alternative form of a written master plan.

DESCRIPTION OF THE PREFERRED EMBODIMENT

Figure 1:
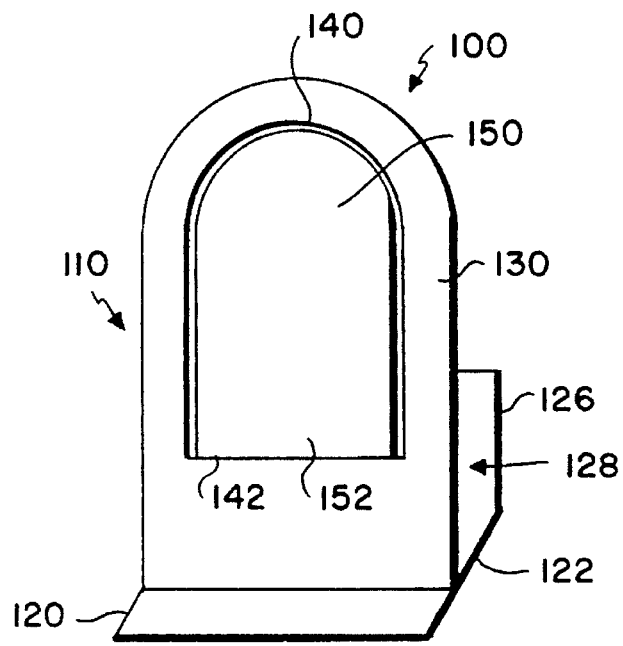
FIG. 1 is a perspective view showing one display device for storing and displaying the cards of the communication system.
Figure 2:
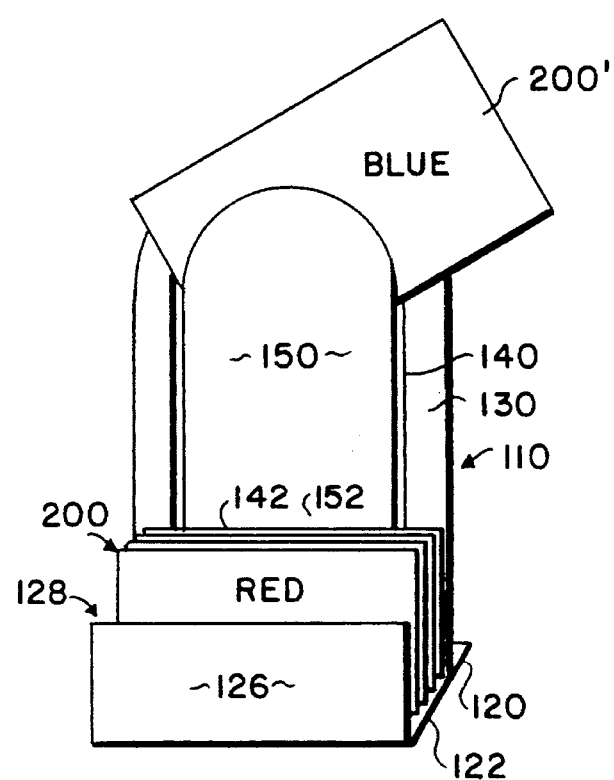
FIG. 2 is a perspective rear view of the device of FIG. 1 with one of the cards of the communication system being in a display position.
Figure 3:
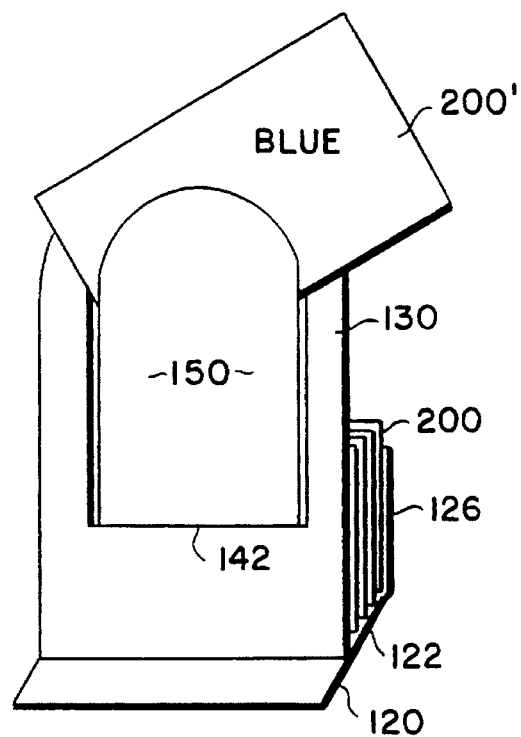
FIG. 3 is an opposed view of the device of FIG. 1.
Figure 4:
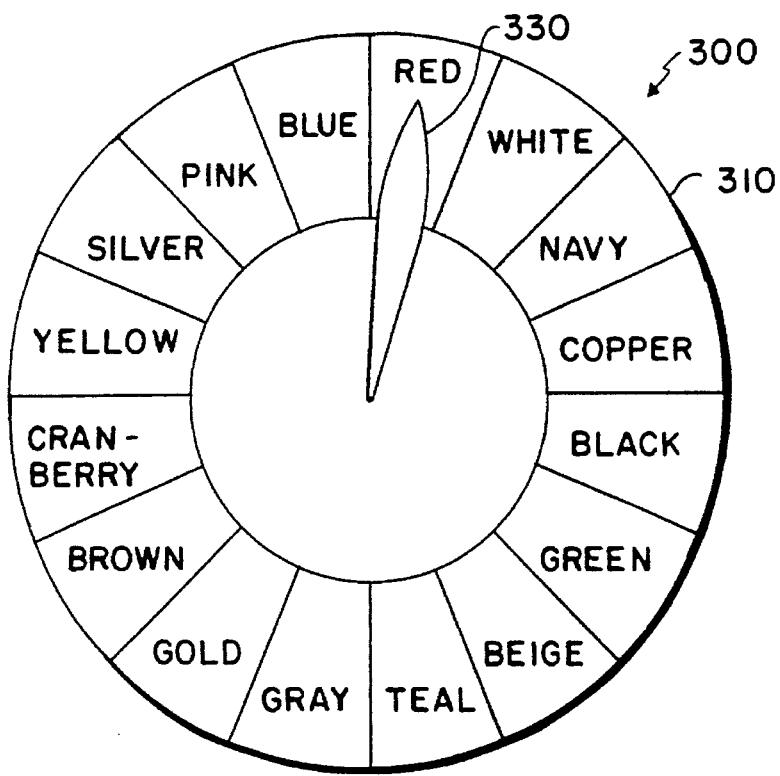
FIG. 4 is an alternative embodiment of a display device.

Turning more particularly to the drawings, FIG. 1 illustrates one form of the communication aid system 100 comprising a holder 110 for storing a plurality of color coded cards 200 therein, the cards 200 corresponding to various moods of the user as indicated on the master plan (FIG. 6).

Each card 200 is preferably of a credit card size and made of a lightweight, easily portable material. The material is preferably relatively rigid so as to inhibit bending, fraying, etc. so as to enhance card 200 longevity. The cards 200 are colored to represent corresponding moods as set forth in the written master plan (FIG. 6), it being understood that the moods set forth in the master plan are only representative. Accordingly, the moods as set forth in the FIGS. 5 or 6 master plans, can be modified, limited and expanded.

Furthermore, it is understood that the color/mood correspondence is not restrictive of my invention, although it is understood that certain colors may be more logically appropriate for certain moods, such as black for a somber/gloomy mood and the relatively brighter colors for relatively happier moods.

Accordingly, it is necessary for the user to display to third persons the chosen card $200^1$ and/or color corresponding and/or approximating the user's mood. A plurality of colors and corresponding moods on the master plan are preferred so as to make a wide variety of options available to the user. In turn, the plurality of cards 200 allow the user to make a concerted effort to find and display a card $200^1$ which will identify or, at the least, approximate his/her particular mood. However, when the proper card $200^1$ is selected, it is essential that the user can effectively display the mood particularly if the user is in a work environment. A third person upon seeing such displayed card can then ascertain the mood and initiate verbal communications, if desired, according to the color displayed.

Accordingly, I provide various card display devices to allow the user to store the plurality of cards and/or display the color approximating the mood on the master plan. One such display device 110 is shown in FIG. 1. This device 110 is preferably made of a lightweight plastic material or the like. The device as shown generally comprises a first base section 120 having a vertical wall 130 extending therefrom. The vertical wall 130 includes a slot 140, the slot 140 encompassing a resilient tab 150 therein. The tab 150 is resiliently integral at its lower end 152 with a bottom edge 142 of slot 140. This combination allows the top of tab 150 to bend so as to be displaced outside the confines of the slot 140.

A second base position 122 extends beyond the wall 130. At the displaced end of the base 122 is an upstanding wall 126 which cooperates with the vertical wall 130 so as to form a storage compartment 128 for the plurality of color coded cards 200. Accordingly, upon a selection of one colored card from the plurality of cards, the card is clamped between the displaced tab 150 and vertical wall 130 for display to third parties. Various fasteners, e.g. VELCRO® hook-and-loop fasteners, magnets, tape, screws, etc., may be used to fasten the wall 126 to a surface if so desired. VELCRO® hook-and-loop fasteners may be placed on the back of the individual cards if one desires to display the cards on a surface without the use of a display device.

A second embodiment of a display device 300 is as shown in which the colored cards are represented as colors readily extending from the hub of a circular card 310. The user then directs dial 330 of the card to the color thereon according to the corresponding mood on the master plan.

Having described the above, it is evident that the communication system may be utilized to represent various moods and/or expressions in situations in which initial verbal communications are not desired. Accordingly, it is to be understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A communication system for conveying a mood of a user comprising:

a plurality of cards, each card having a color different than a color of said other cards;

a written master plan having a plurality of potential color-coded moods of a user written thereon, each mood on said plan corresponding to a color of one card of said plurality of cards;

means for displaying one of said colored cards of said plurality of cards, the user displaying said one of said cards in said display means according to the mood of the user as on said master plan, said display means comprises:
   a base;
   a first wall upwardly extending from said base;
   an aperture in said first wall;
   a tab in said aperture, said tab having a free end moveable between a first position within said aperture and a second position outside said aperture, said second position clamping said selected card between said tab and said first wall.

2. The system as claimed in claim 1 further comprising means for storing said plurality of cards in said display means.

3. The system as claimed in claim 2 wherein said storage means comprises:

a second base extending from said first wall in a direction opposite said first base, said second base presenting an end displaced from said first wall;

a second wall at said second base end, said second wall and second base cooperating with said first wall to form a compartment for storage of said plurality of colored cards therein.

4. A communication system for conveying a mood of a user comprising:

a plurality of colors, each color different than said other colors;

a written master plan having a plurality of potential moods of a user thereon, each mood of said plan identified by a color of said plurality of colors;

card means for displaying said plurality of colors in a fixed form thereon;

means for displaying a chosen one of said colors of said plurality of colors on said card means, said displayed color chosen according to a mood of a user as written on said master plan.

5. The system as claimed in claim 4 wherein said card means includes a hub with said plurality of colors radially extending therefrom.

6. The system as claimed in claim 5 wherein said display means comprises a dial on said hub, said dial having a pointer thereon user movable to said chosen one color on said card means.

7. The system as claimed in claim 4 wherein each color of said plurality of color corresponds to an expression identifying a mood desired to be conveyed by a user.

8. A communication system for associating a user's mental thoughts with an identifiable expression comprising:

a plurality of cards, each card having a color different than a color of said other cards;

a written master plan having a plurality of potential written expressions of a user thereon, each expression on said plan associated with a color of one card of said plurality of cards;

means for displaying one of said colored cards of said plurality of cards according to the user's expression desired to be conveyed as set forth on said master plan, said display means comprises:
   a base;
   a first wall upstanding from said base;
   an aperture in said first wall;
   a tab in said aperture, said tab having a free end moveable between a first position within said aperture and a second position outside said aperture, said second position clamping said selected card between said tab and said upstanding wall.

9. The system as claimed in claim 8 further comprising means for associating said plurality of cards in said display means.

10. The system as claimed in claim 8 wherein said associating means comprises:

a second base extending from said first wall in a direction opposite said first base, said base presenting an end displaced from said first wall;

a second wall at said second base end, said second wall and second base cooperating with said first wall to form a compartment for storage of said plurality of colored cards therein.

11. A communication system for associating a user's mental thoughts with an identifiable expression comprising:

a plurality of colors, each color different than said other color;

a written master plan having a plurality of potential written expressions of a user thereon, each expression of said plan associated with one color of said plurality of colors;

a display medium for fixing thereon said plurality of colors in a form for presentation to a user;

indicator means associated with said display medium and operable by a user for displaying a chosen one of said colors of said plurality of colors, said chosen color corresponding to a user's expression desired to be conveyed as set forth in said master plan.

12. The system as claimed in claim 11 wherein said medium comprises a card having said plurality of colors thereon.

13. The system as claimed in claim 12 wherein said card includes a hub with said plurality of colors radially extending therefrom.

14. The system as claimed in claim 13 wherein said indicator means comprises a dial on said hub, said dial having a pointer thereon user-movable to said chosen one color.

* * * * *